United States Patent
Brick et al.

(10) Patent No.: US 8,058,335 B2
(45) Date of Patent: Nov. 15, 2011

(54) WAX DISPERSIONS FOR TONERS

(75) Inventors: Mary C. Brick, Webster, NY (US);
Dennis J. Massa, Pittsford, NY (US);
Mridula Nair, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 389 days.

(21) Appl. No.: 12/120,594

(22) Filed: May 14, 2008

(65) Prior Publication Data
US 2009/0286911 A1  Nov. 19, 2009

(51) Int. Cl.
*C08L 91/06* (2006.01)
(52) U.S. Cl. ................................ 524/275; 524/315
(58) Field of Classification Search .......... 524/275, 524/315
See application file for complete search history.

(56) References Cited

U.S. PATENT DOCUMENTS

| | | | |
|---|---|---|---|
| 5,756,244 A | 5/1998 | Omatsu et al. | |
| 6,210,853 B1 | 4/2001 | Patel et al. | |
| 6,682,866 B2 | 1/2004 | Sugiyama et al. | |
| 6,800,412 B2 | 10/2004 | Sugiyama et al. | |
| 6,824,945 B2 | 11/2004 | Emoto et al. | |
| 6,849,371 B2 | 2/2005 | Sacripante et al. | |
| 7,026,087 B2 | 4/2006 | Mikuriya et al. | |
| 2004/0044108 A1 | 3/2004 | Agur et al. | |
| 2004/0115551 A1 | 6/2004 | Sugiyama et al. | |
| 2004/0161687 A1 | 8/2004 | Kim et al. | |
| 2007/0299191 A1* | 12/2007 | Lobo et al. | 524/487 |

* cited by examiner

*Primary Examiner* — Robert D. Harlan
(74) *Attorney, Agent, or Firm* — Andrew J. Anderson

(57) ABSTRACT

The present invention provides a dispersion comprising wax particles dispersed with a polymeric dispersant in a water immiscible solvent, wherein the dispersant comprises a wax-compatible polyolefin segment and a polyester compatible oleophilic polar segment. The invention is further directed towards a method of manufacturing such a wax dispersion, and towards methods of manufacturing wax-containing polymer particles by limited coalescence processes employing such a wax dispersion. In particular embodiments, the invention is directed towards chemically prepared toner derived from wax dispersions of the invention that shows improved toner performance.

20 Claims, 2 Drawing Sheets

WAX DISPERSIONS FOR TONERS

FIELD OF THE INVENTION

The present invention relates to waxes and, more particularly, to improved wax dispersions and wax-containing polymer particles and electrophotographic toners derived from them for improved toner performance.

BACKGROUND OF THE INVENTION

Waxes are incorporated into polymer particles such as electrophotographic toners to aid their release from the fuser roller surfaces, without the need to use fuser oil, such as silicone oil, at the fuser. The domain sizes of these waxes affect the many properties of the toner, including the powder flow, tribocharging, release from the funer surface and glossing. The particle size of a wax dispersion may be controlled for example, in a separate step by milling the wax to form a dispersion of the wax in a fluid medium. For chemical preparation of toners, it is beneficial to mill the wax in a volatile organic solvent that is removed during the toner making process. While the wax domain size can be reduced during milling without a dispersing aid, it is usually desirable to have a milling aid that can act as a colloidal stabilizer for the wax particles. The stabilizer is intended to prevent agglomeration of the wax particles thereby increasing the efficiency of milling and reducing the viscosity of the dispersion, allowing for higher yields and consequently lower milling costs.

U.S. Pat. No. 5,756,244 discloses a method of incorporating wax into the toner at the compounding step, where all the ingredients of the toner and the wax are added to the equipment such as an extruder, two roll mill, kneader etc. Typically, the wax is dispersed in the molten state under the processing conditions without an added dispersant to ensure uniform, small wax domains. As a result, when the extruded matrix is pulverized the resulting particles may contain free wax particles or non-homogeneous distribution of wax in the particles, with a high content of surface wax. The surface wax and free wax can adversely affect the performance of the toner in the machine.

U.S. Pat. No. 7,026,087 discloses toner compositions made by melt-kneading toner materials including binder resin, wax, colorant, and a wax dispersant comprising a copolymer of an alpha-olefin, maleic anhydride and maleic anhydride monoester. As the components are melt-kneaded, there is no need for formation of a wax dispersion in an organic solvent in such a process.

It has been found that incorporating fine particles of wax into chemically prepared toners (CPT) results in toners that have little free wax and low surface wax compared to standard melt-pulverized toners. There are different ways of incorporating wax into toners made by chemical preparation. In U.S. Pat. No. 20040161687 A1, small wax particles obtained commercially are added to a solvent phase containing the rest of the toner materials. This organic phase is dispersed in an aqueous phase containing a water soluble surfactant and viscosity modifier to aid in the dispersion. However, the choice of waxes that are readily available with the desired small size is limited.

A way to control the domain size of the wax is to mill the wax within a solvent medium. U.S. Pat. Nos. 6,682,866; 6,800,412; and 6,824,945; and U.S. Patent application Ser. No. 20040115551 disclose combining a polyester binder, pigment, charge control agent and wax that are milled using zirconia beads. The organic phase is then dispersed, with controlled shearing, in an aqueous phase containing hydroxyapatite and sodium dodecyl benzene sulfonate as dispersants. The solvent is then removed by evaporation. While this method is useful for creating small domain sizes of the waxes, it is not cost effective to process the entire toner/wax/solvent mixture to reduce the domain size of the wax.

For CPTs made by the emulsion aggregation technology, aqueous dispersions of wax, latex, pigment and charge control agent are mixed in a reactor and aggregated to form toner-sized particles. Aqueous dispersions of wax can be prepared by several methods. U.S. Pat. Nos. 6,849,371 and 6,210,853 disclose the preparation of wax dispersions by using a sulfonated polyester as a dispersant, which is also the toner binder, raising the aqueous dispersion temperature to above the melting point of the wax, using a high pressure reactor and then emulsifying the wax. U.S. Pat. No. 6,808,851 discloses a similar method with an anionic surfactant as the stabilizer. U.S. Patent application No. 20040044108 A1 describes the details of preparing the wax dispersions. It is substantially more difficult to carry out the emulsion aggregation process and incorporate the wax, than by using a solvent to dissolve and disperse the toner components.

It is required that dispersions of waxes in solvents be prepared for incorporation into toners prepared by certain CPT processes. The dispersions are prepared by breaking down the wax particles into submicron particles using milling media in the presence of dispersants. Typically, dispersants that enable fast milling are good stabilizers. That is, they adsorb strongly to the wax particles, and provide a good barrier to particle flocculation. While flocculated dispersions can be milled, they are typically higher in viscosity and hard to handle in the process. Consequently, the particle concentrations in flocculated dispersions cannot be high. The desired dispersant and stabilizer should be able to produce fast milled dispersions with small particle size and low viscosity.

A method of manufacturing a wax dispersion that includes forming a solution of a solvent and a dispersant, the dispersant being a polymer of partially or fully hydrogenated styrene butadiene wherein the styrene mole fraction of the polymer is from 20 to 90, is disclosed in U.S. Patent application No. 20070299191 A1. Wax is then added to the solution to form a slurry. The particle size of the wax is reduced through comminution of the slurry. The wax dispersion is used for the manufacture of CPT particles. This method has the disadvantage that the dispersant used is not compatible with the binder resins such as for example, polyester binders, which can lead to flocculation of both the wax and the colorants such as pigment dispersions. When the wax dispersion is added to a resin binder, it would be desirable to have wax dispersants that not only produce fast milled dispersions with small particle size and low viscosity, but also are compatible with the binder resins to which they are added, in order to avoid flocculation. For example, pigment concentrates, or pigment pre-dispersions, are used to prepare toners employed in full color electrophotographic processes. Uniform dispersion of a colorant or pigment in a color toner is necessary for realizing the highest possible color gamut, minimizing the amount of toner laid down on a page, achieving reproducibility of color and electrostatic and physical properties, and optimizing the cost of toner preparation. The addition of various additives into the toner such as the wax, for example, can lead to toner with poor color quality and low tinctorial strength if the wax dispersion flocculates the pigment dispersion when the two come into contact during the toner making process.

It is an object of the present invention to provide a wax dispersion in a water-immiscible solvent that produces uniform small wax domains in a toner binder.

It is another object of the present invention to produce wax dispersions where the median particle diameter is less than 1 micrometer.

It is yet another object of the present invention to produce wax-containing polymer particles such as a toner derived from the improved wax dispersion of the invention, where the toner performance is improved.

These and other objects of the invention can be accomplished by use of wax dispersions prepared in water-immiscible solvents using a polymeric dispersant comprised of a copolymer that is compatible with both the wax and toner binders into which the wax may be dispersed.

SUMMARY OF THE INVENTION

In accordance with one embodiment, the present invention provides a dispersion comprising wax particles dispersed with a polymeric dispersant in a water immiscible solvent, wherein the dispersant comprises a wax-compatible polyolefin segment and a polyester compatible oleophilic polar segment. In accordance with a further embodiment, the invention is directed towards a method of manufacturing a dispersion of the invention, comprising: forming a solution of a water immiscible ester solvent and a polymeric dispersant comprising a wax-compatible polyolefin segment and a polyester compatible oleophilic polar segment; adding wax to the solution to form a slurry; and reducing the particle size of the wax through comminution of the slurry.

In accordance with another embodiment, the invention is directed towards a method of manufacturing wax-containing polymer particles by limited coalescence comprising: dissolving a polyester polymer binder in a solvent to form a first solution; adding a wax dispersion according to the invention to said first solution; emulsifying the resulting first solution with added wax dispersion together with an aqueous solution containing a particulate stabilizer to form an emulsion; and removing the solvent from the emulsion to form polymer particles with incorporated wax particles.

In accordance with another embodiment, the invention is directed towards a method of manufacturing wax-containing porous polymer particles by limited coalescence comprising: providing a first emulsion of a first aqueous phase comprising a pore stabilizing hydrocolloid dispersed in an organic solution containing a polyester polymer binder and a wax dispersion according to claim 1; dispersing the first emulsion in a second aqueous phase to form a second emulsion; shearing the second emulsion in the presence of a particulate stabilizing agent to form droplets of the first emulsion in the second aqueous phase; and evaporating the organic solution from the droplets to form porous polymer particles with incorporated wax particles.

In accordance with another embodiment, the invention is also directed towards a particle comprising a first continuous polymer phase, a second wax phase comprising wax particles having an average particle size of less than 1 micrometer dispersed in the polymer phase, and a polymeric dispersant comprising a wax-compatible polyolefin segment and an oleophilic polar segment compatible with the continuous polymer phase. In particular embodiments, the invention is directed towards chemically prepared toner derived from wax dispersions of the invention that shows improved toner performance.

DETAILED DESCRIPTION OF THE INVENTION

Figure 1:
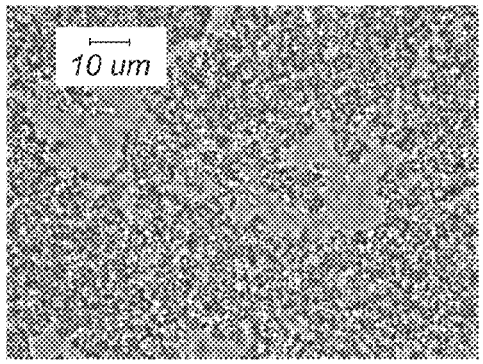
FIGS. 1-12 show photomicrographs of dispersions C-1, C-2, and I-1 to I-10, respectively, as described in the Examples.
Figure 2:
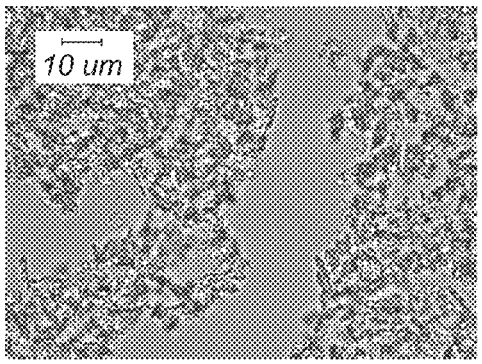
Figure 3:
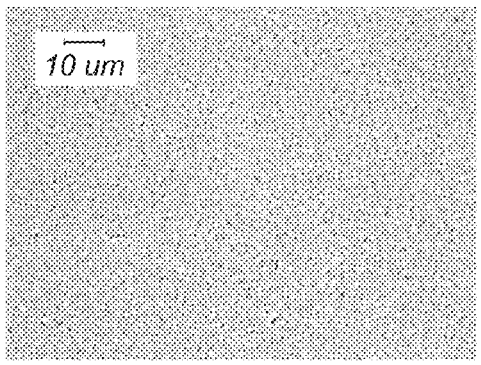
Figure 4:
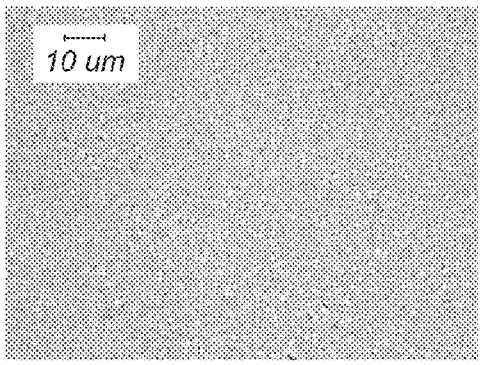
Figure 5:
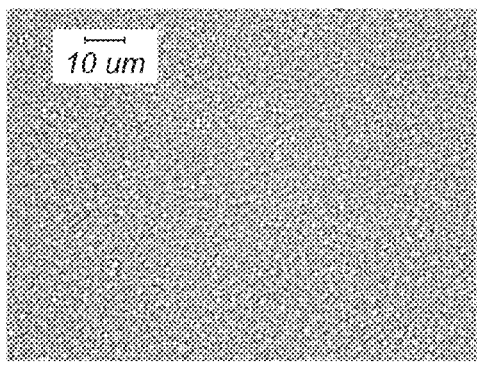
Figure 6:
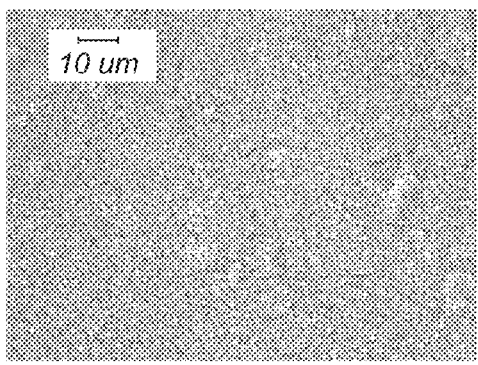
Figure 7:
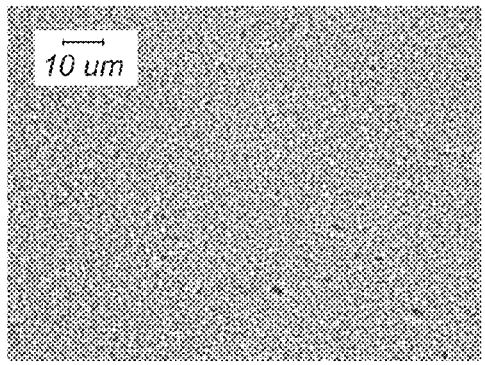
Figure 8:
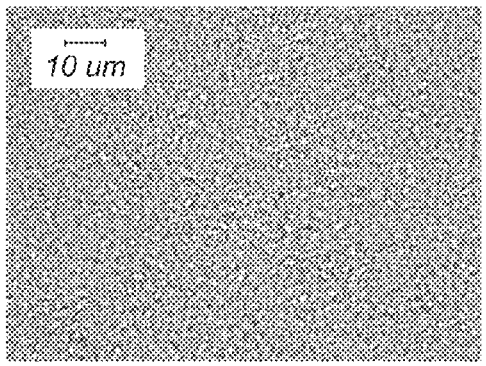
Figure 9:
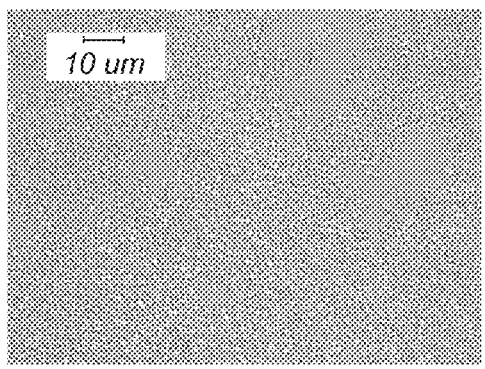
Figure 10:
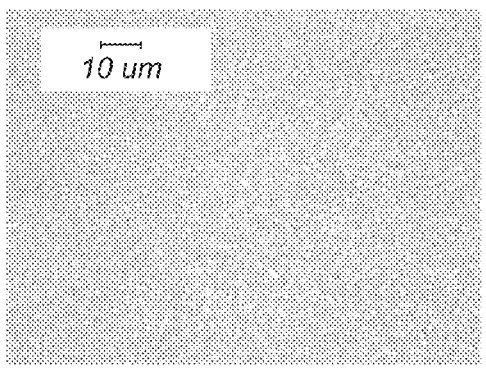
Figure 11:
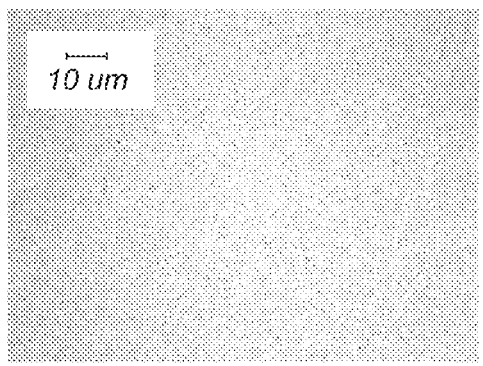
Figure 12:
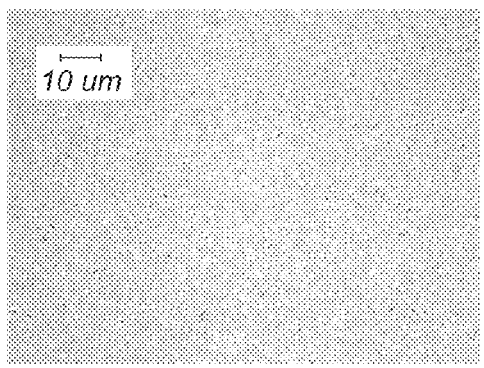

The wax dispersion of the instant invention is made using a dispersant comprising a polymer, copolymer, block copolymer, or graft copolymer comprising a wax-compatible polyolefin segment and a polyester compatible oleophilic polar segment, in which the weight fraction of the polyester compatible oleophilic polar segment of the polymer, copolymer, block copolymer, or graft copolymer is preferably from 20 to 95 percent. The dispersant of this invention is completely or partially soluble in a water immiscible solvent. The choice of solvent will partially specify the actual percentage of the polyester compatible oleophilic polar segment, because of solubility considerations. Any water immiscible solvent that is compatible with the CPT process can be used as described below. Of these the preferred solvents are ethyl acetate, propyl acetate and dichloromethane. The preferred weight fraction of the polyester compatible oleophilic polar segment in the preferred solvents is between 25 and 90%. The molecular weight of the polymer can be from 300 to 100,000 daltons, preferably between 500 and 50,000 daltons, and more preferably from 750 to 10,000 daltons. If the molecular weight is too low the dispersant polymer may not provide adequate stability to the wax particles to prevent flocculation. If the molecular weight is too high, e.g., above about 10,000 daltons, it will increase the viscosity of the dispersion and may also cause flocculation.

For incorporation into polymeric particles comprising polyester binder, the oleophilic polar segment is further specified by the requirement that it be compatible with the polyester polymer binder of the particles. In one embodiment of the invention, the wax dispersion itself may further comprise a polyester polymer binder dissolved in the solvent, wherein the oleophilic polar segment is compatible with the polyester polymer binder. For example, a typical binder polymer that has the desired fusing and glossing properties for toner particles is a polyester that has a glass transition temperature of between 50 and 70° C. [DeMejo, Lawrence; Massa, Dennis; Wesson, Jeffrey; Wilson, John, Proceedings of SPIE—The International Society for Optic Engineering, 1253(Hard Copy Print. Mater., Media, Processes), 85-95 (1990).] For example, since bisphenol-A containing polymers have been shown to be compatible with certain aliphatic polyesters [Cruz, C. A.; Paul, D. R.; Barlow, J. W. Journal of Applied Polymer Science, 24(10), 2101-12 (1979)], aliphatic polyesters are desirable as oleophilic polar segment compatible with the polyester binder. Other specific segments may be desirable for other polymer binders. Further it is desired that the wax-compatible polyolefin segment of the dispersant be partially or totally saturated carbon-carbon bonds, either from the constituent polyolefin structure or by hydrogenation. The mole fraction of the polyolefin that is to be saturated or hydrogenated is from 2 to 100% and preferably from 30 to 100%.

The preferred polymeric dispersants of the present invention comprise block and graft copolymers and alternating polymers of olefins with polyester compatible oleophilic polar segments. The block copolymers may be diblock or higher blocks. The polyester compatible oleophilic polar segment includes polyesters, polycarbonates, polyamides, maleic anhydride and its derivatives such as maleic acid esters, polyalkanoates, and the like. Of these the most preferred are polymers derived from lactic acid, caprolactone, glycolic acid, maleic anhydride, propylene carbonate, and the like. Examples of oleophilic polar segments that are not polyester compatible include polypropylene oxide, polyethylene oxide and the like.

By polyester compatible oleophilic polar segment is meant a polar group or polymer segment that is at least partially soluble in a polar solvent such as ethyl acetate, propyl acetate, tetrahydrofuran, dichloromethane, and the like, and that, when mixed with a polar polymer such as a polyester, the two are at least partially soluble or miscible with each other, as evidenced by changes in the glass transition temperatures or crystallization behaviors of the mixture when compared with those of its constituents.

The term wax compatible polyolefin segment is used herein to mean a polyolefin segment that, when mixed with a wax, is at least partially soluble or miscible with the wax, as evidenced by changes in the wax and/or polymer segment glass transition temperatures or crystallization behaviors of the mixture when compared with those of its constituents. Wax compatible polyolefin segments preferably have a molecular weight of at least 100. Examples of polyolefin segments include but are not limited to polyethylene, polypropylene, polybutadiene and hydrogenated polybutadiene, and poly(ethylene-co-butylene) segments.

The wax can be dispersed in a single solvent or a mixture of solvents. In a preferred embodiment of this invention the wax dispersion is used in the preparation of electrophotographic toner prepared with the aid of a solvent as described in U.S. Pat. No. 4,833,060. It is highly preferred that the solvent used for the preparation of the wax dispersion of the current invention, be the same as the one being used to prepare the toner. Solvents that are useful for the preparation of toner include, e.g., chloromethane, dichloromethane, ethyl acetate, propyl acetate, vinyl chloride, methyl ethyl ketone (MEK), trichloromethane, carbon tetrachloride, ethylene chloride, trichloroethane, toluene, xylene, cyclohexanone, 2-nitropropane, 2-butanone, 1,2-dichloroethane, and the like. In a particular embodiment of the invention, an ester solvent is preferably employed. In some instances it may be more desirable to use a mixture of two or more of the above solvents. The dispersant employed in the current invention can either be first dissolved/dispersed in the solvent of choice or added simultaneously with the wax that is to be milled.

Any wax may be used for the purpose of the present invention. Examples of such waxes include polyolefins such as polyethylene wax and polypropylene wax, and long chain hydrocarbon waxes such as paraffin wax. Another class of waxes are carbonyl group-containing waxes which include long-chain aliphatic ester waxes, as well as polyalkanoic acid ester waxes such as montan wax, trimethylolpropane tribehenate, glycerin tribehenate; polyalkanol ester waxes such as tristearyl trimellilate and distearyl maleate; polyalkanoic acid amide waxes such as trimellitic acid tristearyl amide. Examples of useful aliphatic amides and aliphatic acids include oleamide, eucamide, stearamide, behenamide, ethylene bis(oleamide), ethylene bis(stearamide), ethylene bis(behenamide) and long chain acids including stearic, lauric, montanic, behenic, oleic and tall oil acids. Particularly preferred aliphatic amides and acids include stearamide, erucamide, ethylene bis(stearamide) and stearic acid. The aliphatic amide or aliphatic acid is present in an amount from about 0.5 to 30 percent by weight, preferably from about 0.5 to 10 percent by weight. Mixtures of aliphatic amides and aliphatic acids can also be used. One useful stearamide is commercially available from Witco Corporation as Kemamide S™. A useful stearic acid is available from Witco Corporation as Hysterene 9718™. Naturally occurring polyalkanoic acid ester waxes include Carnauba wax. A particularly useful class of ester waxes is made from long chain fatty acids and alcohol. Examples of this class are Licowax series made by Clariant Corp. derived from montanic acid. Another example useful in toner applications are the WE series made by NOF which is a highly purified narrow melting solid ester wax. Fluorinated waxes such as Polyfluo 190, Polyfluo 200, Polyfluo 523XF, Aqua Polyfluo 411—all polyethylene/PTFE functionalized waxes, Aqua Polysilk 19, Polysilk 14—all polyethylene/PTFE/amide functionalized waxes available from Micro Powders INC are also useful. The choice of wax is not limited to a single wax. Two or more of the above waxes may be incorporated into the dispersion to give improved toner performance. The wax WE-3 made by NOF, a long-chain ester wax made from long chain fatty acids and alcohol, is a preferred wax because it has a narrow melting range with little melting that takes place below 40° C. Preferably, the wax employed has a percent crystallinity of greater than 50%.

Although the wax used in the present invention can have a broad range of applications, it is generally desired for toner applications that the wax have a melting point of 40-160° C., preferably 50-120 ° C., more preferably 60-90° C. A melting point of wax below 40° C. may adversely affect the heat resistance and preservability of the toner, while too high a melting point—i.e. in excess of 160° C.—is apt to cause cold offset of toner when the fixation is performed at a low temperature. Additionally, the melting peak of wax as obtained by methods such as differential scanning calorimetry, and it is preferred that the onset of melting to the peak melting temperature be greater than 20° C., preferably greater than 50° C. Preferably, the wax has a melt viscosity of 5-1000 cps, more preferably 10-100 cps, at a temperature higher by 20° C. than the melting point thereof. When the viscosity is greater than 1000 cps, the anti-hot offset properties and low fixation properties of the toner are adversely affected. The amount of the wax in the toner is generally 0.1-40% by weight, preferably 0.5-10% by weight, based on the weight of the toner.

The wax dispersion of the instant invention can be prepared by any one of several comminution processes. These include high shear dispersers like the IKA mill, Kady mill or a Gaulin mill. Equipment used to homogenize emulsions may also be used, particularly where the wax particles are brittle. Media milling techniques are particularly useful for comminution of solid particles. Media milling can be accomplished by an attritor, a ball mill, a media mill or a vibration mill using media made of silica, silicon nitride, sand, zirconium oxide, alumina, titanium, glass, etc. The bead sizes typically range from 0.25 to 3.0 mm in diameter. The volume of the media can be from 5 to 200% of the volume of the dispersion containing the wax particles. The slurry containing the solvent with dissolved/dispersed polymer and wax particles added to the mill where repeated collisions of the milling media with the solid wax particles result in fracture and consequent particle size reduction. The milling process is continued till the desired particle size of the wax is obtained.

The slurry that is being milled contains one or more solvents described earlier, one or more types of waxes described above and at least one dispersant of this invention. The weight percent amount of wax particles in the slurry can be from 0.1% to 50%. If the wax dispersion is further used to make electrophotographic toner, the time involved in processing a given amount of wax is directly proportional to the cost of making the toner. In order to maximize productivity and minimize the cost, it is desired that the wax content in the slurry be high as possible. However, if it is too high, the viscosity of the slurry becomes high which can decrease the efficiency of milling (increase time for milling) and reduce the yield because it is hard to separate from the milling media. The rheological profile of the solid particle dispersion is typically shear thinning—i.e. its viscosity decreases as the rate of shear imparted increases. A partially stabilized or unstable dispersion will typically exhibit an extreme case of shear thinning where the viscosity at low shear rates (<0.5 $s^{-1}$) is high. In an extreme case an unstable, flocculated dispersion may exhibit a yield stress and may not flow at the low shear rates. The proper choice of dispersant, such as the one described in the instant invention, will stabilize the particles and reduce the viscosity at low shear rates.

In order to make the wax milling process economically viable it is desired that the wax particles in the dispersion be well dispersed and with a median particle size less than 1 micron, more preferably from 0.2 to 0.7 micron. In order to achieve a stable, well dispersed wax dispersion, the dispersant of this invention should be present at a level from between 2 to 50% based on the amount of wax present. The preferred amount is from 5 to 25%. If the level is too low, there will not be enough dispersant to stabilize the wax particles when the size is reduced. If the level is too high, the polymer will comprise a significant portion of the toner when the dispersion is used to prepare the toner.

Wax dispersions of the invention may also include other co-dispersants, such as nonionic polymers. In a particular preferred embodiment, polymers for use as co-dispersants to improve milling efficiency include cellulose derivatives such as ethyl cellulose, and vinyl acetal polymers and copolymers, such as polyvinyl acetal, polyvinyl butyral, polyvinyl pental, and polyvinylhexal, and co-polymers thereof such as poly(vinyl butyral-co-vinyl hexal), poly(vinyl butyral-co-vinyl heptal), poly(vinyl butyral-co-vinyl octal), and poly(vinyl butyral-co-vinyl naphthal).

In a preferred embodiment it is desired that the dispersion of the instant invention be incorporated in electrophotographic toners, especially as release agents in toners used in oil-less fusing. It is well known in the art that in order for the wax to perform well as a release agent upon fusing that the wax blooms to the surface of the toner. However, prior to the fusing step it is also desired that the wax be encapsulated by the toner binder. In order for this to happen, the wax particle size should be substantially smaller than the final desired size of the toner particle.

The predispersed wax of this invention may be incorporated in both chemically prepared and conventional melt pulverized toners (MPT). Conventional MPT powders are generally made up of a binder polymer and other ingredients, such as pigment and a charge control agent, that are melt blended on a heated roll or in an extruder. The resulting solidified blend is then ground or pulverized to form a powder.

The wax dispersions of this invention are preferably used for making chemically prepared toners. While there are several methods described in the art to make CPTs, the dispersion of the instant invention is mainly useful in processes that dissolve/disperse the toner components in a solvent phase. The wax dispersions of this invention are most preferably incorporated in the preparation of toner polymer powders from a preformed polymer by the CPT process such as the "Evaporative Limited Coalescence" (ELC) process which offers many advantages over the conventional grinding method of producing toner particles. In this process, polymer particles having a narrow size distribution are obtained by forming a solution of a polymer in a solvent that is immiscible with water, dispersing the solution so formed in an aqueous medium containing a solid colloidal stabilizer and removing the solvent. The resultant particles are then isolated, washed and dried.

In the practice of this technique, polymer particles are prepared from a polymer that is soluble in a solvent that is immiscible with water. Thus, the size and size distribution of the resulting particles can be predetermined and controlled by the relative quantities of the particular polymer employed, the solvent, the quantity, and the size of the water insoluble solid particulate suspension stabilizer, typically silica or latex, and the size to which the solvent-polymer droplets are reduced by mechanical shearing using rotor-stator type colloid mills, high pressure homogenizers, agitation etc.

Limited coalescence techniques of this type have been described in numerous US Patents pertaining to the preparation of electrostatic toner particles because such techniques typically result in the formation of polymer particles having a substantially uniform size distribution. Representative limited coalescence processes employed in toner preparation are described in U.S. Pat. Nos. 4,833,060, 4,965,131, 6,544,705, 682,866; and 6,800,412; and U.S. patent application No. 20040161687 A1, incorporated herein by reference for all that they contain.

Limited coalescence techniques can produce smaller toner particles with narrower size distributions than grinding and pulverizing. These smaller toner particle sizes result in improved image quality.

In a preferred embodiment the toner is prepared by dissolving/dispersing the binder, optionally one or more pigments, one or more charge control agents in one or more of the preferred solvents. The wax dispersion of the instant invention is added to this mixture and mixed well. The order of adding the dispersion is not important.

An aqueous phase containing a stabilizer is prepared. The preferred stabilizer is particulate and optionally, a promoter is used to drive the particulate stabilizer to the interface between the water layer and the polymer solvent droplets formed by homogenizing the system. Suitable colloidal stabilizers known in the art of forming polymeric particles by the limited coalescence technique can be employed such as, for example, inorganic materials such as, metal salt or hydroxides or oxides or clays, organic materials such as starches, sulfonated crosslinked organic homopolymers and resinous polymers as described, for example, in U.S. Pat. No. 2,932,629; silica as described in U.S. Pat. No. 4,833,060; and copolymers such as copoly(styrene-2-hydroxyethyl methacrylate-methacrylic acid-ethylene glycol dimethacrylate) as described in U.S. Pat. No. 4,965,131, all of which are incorporated herein by reference. Silica is the preferred suspension stabilizing agent for use in accordance with this invention. The silica stabilizer generally should have dimensions such that they are from about 0.001 µm to about 1 µm preferably from about 5 to 150 nanometers and most preferably from about 5-75 nanometers. The size and concentration of these particles control and predetermine the size of the final toner particle. Examples of colloidal silica are those sold under the brand names of Ludox, Nalcoag and Snowtex among others. Colloidal silicas are naturally charged negatively at pH greater than 2 and these are the preferred stabilizers. However, silica modified with alumina are positively charged and are also suitable as a stabilizer.

Suitable promoters to drive the suspension stabilizing agent to the interface of the lubricant droplets and the aqueous phase include sulfonated polystyrenes, alginates, carboxymethyl cellulose, tetramethyl ammonium hydroxide or chloride, triethylphenyl ammonium hydroxide, triethylphenyl ammonium hydroxide, triethylphenyl ammonium chloride, diethylaminoethylmethacrylate, gelatin, glue, casein, albumin, gluten, methoxycellulose, and the like. A particularly suited promoter is a water-soluble soluble condensation product of diethanol amine and adipic acid, such as poly(adipic acid-co-methylaminoethanol), water soluble condensation products of ethylene oxide, urea, and formaldehyde and polyethyleneimine. In the case of colloidal silica as stabilizer, it is generally desired to control the pH of the system at a value of from about 2 to about 7, preferably from about 3 to 6 and most preferably 4. The promoter should be present in an amount of 1 to about 50 percent based on the amount of silica.

The dispersion of the suspension droplets containing the binder and the dispersant in the aqueous medium is then vigorously mixed by any suitable device including high speed agitation, ultrasonic devices, homogenizers, and the like in order to reduce the particle size of the lubricant droplets to less than that ultimately desired. The presence of the particulate suspension stabilizer then controls the level of coalescence that takes place until an equilibrium is reached and the particle size does not grow any farther.

The solvent is next removed from the droplets by any suitable technique, such as under reduced pressure. The solvent can also be removed by purging the stirred dispersion with air or an inert gas like nitrogen. U.S. Pat. No. 5,580,692 discloses a method by which excess water is added to the dispersion that extracts the solvent. The resulting toner particles are separated from the water/solvent mixture by filtration.

The silica stabilizer may be removed from the surface of the polymer particles if required by any suitable technique such as dissolving in HF or other fluoride ion or by adding an alkaline agent such as potassium hydroxide to the aqueous phase containing the polymer particles to thereby raise the pH to at least about 12 while stirring. The alkaline addition method is preferred. Subsequently to raising the pH and dissolving the silica, the polymer particles can be recovered by filtration and finally washed with water or other agents to remove any desired impurities from the surface thereof. The toner particles thus produced can be dried and surface treated to produce usable toner for electrophotographic engines.

The toner may optionally have charge control agents incorporated in them. The term charge-control agent refers to a toner addendum used to modify the triboelectric charging properties of the resulting toner. A very wide variety of charge control agents for positive and negative charging toners are available. Suitable charge control agents are disclosed, for example, in U.S. Pat. Nos. 3,893,935; 4,079,014; 4,323,634; and 4,394,430; and British Patent Numbers. 1,501,065 and 1,420,839 all of which are incorporated in their entireties by reference herein. Additional charge control agents which are useful are described in U.S. Pat. Nos. 4,624,907; 4,814,250; 4,840,864; 4,834,920; 4,683,188; and 4,780,553 all of which are incorporated in their entireties by reference herein. Mixtures of charge control agents can also be used. Particular examples of charge control agents include chromium salicylate organo-complex salts, and azo-iron complex-salts, an azo-iron complex-salt, particularly ferrate (1-), bis[4-[(5-chloro-2-hydroxyphenyl)azo]-3-hydroxy-N-phenyl-2-naphthalenecarboxamidato(2-)], ammonium, sodium, and hydrogen (Organoiron available from Hodogaya Chemical Company Ltd.).

The binders useful in the practice of the present invention can be any type of polymer or resin. Preferred are polymers that are suitable as the binder for dry electrophotographic toners such as vinyl polymers, acrylic polymers, polyesters, polyurethane resins, epoxy resins, silicone resins, polyamide resins, modified rosins, and the like. Particularly polymers include polyesters of aromatic or aliphatic dicarboxylic acids with one or more aliphatic diols, such as polyesters of isophthalic or terephthalic or fumaric acid with diols such as ethylene glycol, cyclohexane dimethanol and bisphenol adducts of ethylene or propylene oxides. Especially preferred is a polymer suitable for ELC which means it is capable of being dissolved in a solvent that is immiscible with water wherein the polymer itself is substantially insoluble in water such as Kao E, Kao N, and Piccotoner 1221.

Preferably the acid values (expressed as milligrams of potassium hydroxide per gram of resin) of the polyester resins are in the range of 2 to 100. The polyesters may be saturated or unsaturated. Of these resins, styrene/acryl and polyester resins are particularly preferable. In the practice of this invention, it is particularly advantageous to utilize resins having a viscosity in the range of 1 to 100 centipoise when measured as a 20 weight percent solution in ethyl acetate at 25° C.

Pigments suitable for use in the practice of the present invention are disclosed, for example, in U.S. Reissue Pat. No. 31,072 and in U.S. Pat. Nos. 4,414,152 and 4,416,965. As the colorants, known colorants can be used. The colorants include, for example, carbon black, Aniline Blue, Calcoil Blue, Chrome Yellow, Ultramarine Blue, DuPont Oil Red, Quinoline Yellow, Methylene Blue Chloride, Phthalocyanine Blue, Malachite Green Oxalate, Lamp Black, Rose Bengal, C.I. Pigment Red 48:1, C.I. Pigment Red 122, C.I. Pigment Red 57:1, C.I. Pigment Yellow 97, C.I. Pigment Yellow 12, C.I. Pigment Yellow 17, C.I. Pigment Blue 15:1 and C.I. Pigment Blue 15:3. Colorants can generally be employed in the range of from about 1 to about 90 weight percent on a total toner powder weight basis, and preferably in the range of about 2 to about 20 weight percent, and most preferably from 4 to 15 weight percent in the practice of this invention. When the colorant content is 4% or more by weight, a sufficient coloring power can be obtained, and when it is 15% or less by weight, good transparency can be obtained. Mixtures of colorants can also be used. Colorants in any form such as dry powder, its aqueous or oil dispersions, or wet cake can be used in the present invention. Colorant milled by any methods like media-mill or ball-mill can be used as well.

Any suitable organic solvent that will dissolve the polymer and which is also immiscible with water may be used, such as for example, chloromethane, dichloromethane, ethyl acetate, propyl acetate, vinyl chloride, trichloromethane, carbon tetrachloride, ethylene chloride, trichloroethane, toluene, xylene, cyclohexanone, 2-nitropropane, and the like. Particularly useful solvents are ethyl acetate and propyl acetate for the reason that they are both good solvents for many polymers while at the same time are immiscible with water. Further, their volatility is such that they are readily removed from the discontinuous phase droplets as described below, by evaporation.

Optionally, the solvent that will dissolve the binder polymer and which is immiscible with water may be a mixture of two or more water-immiscible solvents chosen from the list given above.

The average particle diameter of the discrete wax-containing polymer particles of the present invention is, for example, 2 to 50 micrometers, preferably 3 to 20 micrometers.

The discrete particles of this invention can be spherical or irregular in shape. However, the shape of toner particles has a bearing on the electrostatic toner transfer and cleaning properties. Thus, for example, the transfer and cleaning efficiency of toner particles have been found to improve as the sphericity of the particles is reduced. A number of procedures to control the shape of toner particles are known in the art. In the practice of this invention, additives may be employed in the water phase or in the oil phase if necessary. The additives may be added after or prior to forming the water-in-oil-in-water emulsion. In either case the interfacial tension is modified as the solvent is removed resulting in a reduction in sphericity of the particles. U.S. Pat. No. 5,283,151 describes the use of carnauba wax to achieve a reduction in sphericity of the particles. U.S. Ser. No. 11/611,208 filed Dec. 15, 2006 entitled "TONER PARTICLES OF CONTROLLED SURFACE MORPHOLOGY AND METHOD OF PREPARATION" describes the use of certain metal carbamates that are useful to control sphericity and U.S. Ser. No. 11/621,226 filed Dec. 15, 2006 entitled "TONER PARTICLES OF CONTROLLED MORPHOLOGY" describes the use of specific salts to control sphericity. US 2007/0298346 entitled "TONER PARTICLES OF CONTROLLED MORPHOLOGY" describes the use of quaternary ammonium tetraphenylborate salts to control sphericity. The disclosures of these applications are incorporated by reference herein in their entireties.

Toner particles of the present invention may also contain flow aids in the form of surface treatments. Surface treatments are typically in the form of inorganic oxides or polymeric powders with typical particle sizes of 5 nm to 1000 nm. With respect to the surface treatment agent also known as a spacing agent, the amount of the agent on the toner particles is an amount sufficient to permit the toner particles to be stripped from the carrier particles in a two component system by the electrostatic forces associated with the charged image or by mechanical forces. Preferred amounts of the spacing agent are from about 0.05 to about 10 weight percent, and most preferably from about 0.1 to about 5 weight percent, based on the weight of the toner.

The spacing agent can be applied onto the surfaces of the toner particles by conventional surface treatment techniques such as, but not limited to, conventional powder mixing techniques, such as tumbling the toner particles in the presence of the spacing agent. Preferably, the spacing agent is distributed on the surface of the toner particles. The spacing agent is attached onto the surface of the toner particles and can be attached by electrostatic forces or physical means or both. With mixing, uniform mixing is preferred and achieved by such mixers as a high energy Henschel-type mixer which is sufficient to keep the spacing agent from agglomerating or at least minimizes agglomeration. Furthermore, when the spacing agent is mixed with the toner particles in order to achieve distribution on the surface of the toner particles, the mixture can be sieved to remove any agglomerated spacing agent or agglomerated toner particles. Other means to separate agglomerated particles can also be used for purposes of the present invention.

The preferred spacing agent is silica, such as those commercially available from Degussa, like R-972, or from Wacker, like H2000. Other suitable spacing agents include, but are not limited to, other inorganic oxide particles, polymer particles and the like. Specific examples include, but are not limited to, titania, alumina, zirconia, and other metal oxides; and also polymer particles preferably less than 1 μm in diameter (more preferably about 0.1 μm), such as acrylic polymers, silicone-based polymers, styrenic polymers, fluoropolymers, copolymers thereof, and mixtures thereof.

The wax dispersions of the present invention may also be incorporated in porous particles, especially those useful as electrophotographic toners as described in U.S. Ser. No. 11/624,252 filed Jan. 18, 2007 entitled "TONER POROUS PARTICLE CONTAINING HYDROCOLLOIDS", U.S. Ser. No. 11/624,335 filed Jan. 18, 2007 entitled "TONER MANUFACTURING METHOD", and U.S. Ser. No. 11/870,710 filed Oct. 11, 2007 entitled "METHOD FOR MANUFACTURING POROUS PARTICLES WITH NON-POROUS SHELL", the disclosures of which are incorporated herein in their entireties. Such porous particles may include "micro", "meso" and "macro" pores, which according to the International Union of Pure and Applied Chemistry are the classifications recommended for pores less than 2 nm, 2 to 50 nm, and greater than 50 nm respectively. The term porous particles will be used herein to include pores of all sizes, including open or closed pores. Porous particles employed in preferred embodiments of the invention preferably have a porosity of at least 10 percent.

One suitable process for making porous polymer particles as described in the above referenced patent applications involves basically a three-step process. The first step involves the formation of a stable water-in-oil emulsion, including a first aqueous solution of a pore stabilizing hydrocolloid dispersed finely in a continuous phase of a binder polymer dissolved in an organic solvent. This first water phase creates the pores in the particles of this invention and the pore stabilizing compound controls the pore size and number of pores in the particle, while stabilizing the pores such that the final particle is not brittle or fractured easily.

Suitable pore stabilizing hydrocolloids include both naturally occurring and synthetic, water-soluble or water-swellable polymers such as, cellulose derivatives e.g., carboxymethyl cellulose (CMC) also referred to as sodium carboxy methyl cellulose, gelatin e.g., alkali-treated gelatin such as cattle bone or hide gelatin, or acid treated gelatin such as pigskin gelatin, gelatin derivatives e.g., acetylated gelatin, phthalated gelatin, and the like, substances such as proteins and protein derivatives, synthetic polymeric binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, water soluble microgels, polyelectrolytes and mixtures thereof.

In order to stabilize the initial first step water-in-oil emulsion so that it can be held without ripening or coalescence, if desired, it is preferable that the hydrocolloid in the water phase have a higher osmotic pressure than that of the binder in the oil phase depending on the solubility of water in the oil. This dramatically reduces the diffusion of water into the oil phase and thus the ripening caused by migration of water between the water droplets. One can achieve a high osmotic pressure in the water phase either by increasing the concentration of the hydrocolloid or by increasing the charge on the hydrocolloid (the counter-ions of the dissociated charges on the hydrocolloid increase the osmotic pressure of the hydrocolloid). It can be advantageous to have weak base or weak acid moieties in the pore stabilizing hydrocolloid that allow for the osmotic pressure of the hydrocolloid to be controlled by changing the pH. We call these hydrocolloids "weakly dissociating hydrocolloids". For these weakly dissociating hydrocolloids the osmotic pressure can be increased by buffering the pH to favor dissociation, or by simply adding a base (or acid) to change the pH of the water phase to favor dissociation. A preferred example of such a weakly dissociating hydrocolloid is CMC that has a pH sensitive dissociation (the carboxylate is a weak acid moiety). For CMC the osmotic pressure can be increased by buffering the pH, for example using a pH 6-8 phosphate buffer, or by simply adding a base to raise the pH of the water phase to favor dissociation (for CMC the osmotic pressure increases rapidly as the pH is increased from 4-8).

Other synthetic polyelectrolytes hydrocolloids such as polystyrene sulphonate (PSS) or poly(2-acrylamido-2-methylpropanesulfonate) (PAMS) or polyphosphates are also possible hydrocolloids. These hydrocolloids have strongly dissociating moieties. While the pH control of osmotic pressure that can be advantageous, as described above, is not possible due to the strong dissociation of charges for these strongly dissociating polyelectrolyte hydrocolloids, these systems will be insensitive to varying level of acid impurities. This is a potential advantage for these strongly dissociating polyelectrolyte hydrocolloids particularly when used with binder polymers that have varying levels of acid impurities such as polyesters.

The essential properties of the pore stabilizing hydrocolloids are solubility in water, no negative impact on multiple emulsification process, and no negative impact on melt rheology of the resulting particles that is important in fusing of the particles after printing. The pore stabilizing compounds can be optionally cross-linked in the pore to minimize migration of the compound to the surface. The amount of the hydrocolloid used in the first step will depend on the amount of porosity and size of pores desired and the molecular weight of the hydrocolloid. A particularly preferred hydrocolloid is CMC and in an amount of from 0.5-20 weight percent of the binder polymer, preferably in an amount of from 1-10 weight percent of the binder polymer.

The first aqueous phase may additionally contain, if desired, salts to buffer the solution and to optionally control the osmotic pressure of the first aqueous phase as described earlier. For CMC the osmotic pressure can be increased by buffering using a pH 7 phosphate buffer. It may also contain additional porogen or pore forming agents such as ammonium carbonate.

The wax dispersion is added to the binder polymer solution in the water immiscible solvent along with various additives generally present in electrostatograhic toner such as colorants, and charge control agents. The order of addition is not important.

The second step in the formation of the porous particles involves forming a water-in-oil-in-water emulsion by dispersing the above mentioned water-in-oil emulsion in a second aqueous phase containing either stabilizer polymers such as poylvinylpyrrolidone or polyvinylalchol or more preferably colloidal silica such as Ludox or latex particles in a modified ELC process described in U.S. Pat. Nos. 4,883,060; 4,965,131; 2,934,530; 3,615,972; 2,932,629 and 4,314,932, the disclosures of which are hereby incorporated by reference.

Specifically, in the second step of the process of the formation of porous particles, the water-in-oil emulsion is mixed with the second aqueous phase containing colloidal silica stabilizer to form an aqueous suspension of droplets that is subjected to shear or extensional mixing or similar flow processes, preferably through an orifice device to reduce the droplet size, yet above the particle size of the first water-in-oil emulsion, and achieve narrow size distribution droplets through the limited coalescence process. The pH of the second aqueous phase is generally between 4 and 7 when using silica as the colloidal stabilizer.

The suspension droplets of the first water-in-oil emulsion in the second aqueous phase, results in droplets of resin dissolved in oil containing the first aqueous phase as finer droplets within the bigger resin droplets, which upon drying produces porous domains in the resultant particles of resin as shows in FIG. 1. The actual amount of silica used for stabilizing the droplets depends on the size of the final porous particle desired as with a typical limited coalescence process, which in turn depends on the volume and weight ratios of the various phases used for making the multiple emulsion.

Any type of mixing and shearing equipment may be used to perform the first step of this invention, such as a batch mixer, planetary mixer, single or multiple screw extruder, dynamic or static mixer, colloid mill, high pressure homogenizer, sonicator, or a combination thereof. While any high shear type agitation device is applicable to this step of the present invention, a preferred homogenizing device is the MICROFLUIDIZER such as Model No. 110T produced by Microfluidics Manufacturing. In this device, the droplets of the first water phase (discontinuous phase) are dispersed and reduced in size in the oil phase (continuous phase) in a high shear agitation zone and, upon exiting this zone, the particle size of the dispersed oil is reduced to uniform sized dispersed droplets in the continuous phase. The temperature of the process can be modified to achieve the optimum viscosity for emulsification of the droplets and to control evaporation of the solvent. For the second step, where the water-in-oil-in-water emulsion is formed the shear or extensional mixing or flow process is controlled in order to prevent disruption of the first emulsion and droplet size reduction is achieved by homogenizing the emulsion through a capillary orifice device, or other suitable flow geometry. In the method of this invention, the range of back pressure suitable for producing acceptable particle size and size distribution is between 100 and 500 psi, preferably between 500 and 2000 psi. The preferable flow rate is between 1000 and 600 mL per minute.

The final size of the particle, the final size of the pores and the surface morphology of the particle will be impacted by the osmotic mismatch between the osmotic pressure of the inner water phase, the organic binder phase and the outer water phase. At each interface, the larger the osmotic pressure gradient present, the faster the diffusion rate where water will diffuse from the lower osmotic pressure phase to the higher osmotic pressure phase. If either the exterior water phase or the interior water phase has an osmotic pressure less than the organic binder phase then water will diffuse into and saturate the organic binder phase. For the preferred organic phase solvent of ethyl acetate this can result in approximately 8% by weight water dissolved in the organic phase. If the osmotic pressure of the exterior water phase is higher than the binder phase then the water will migrate out of the pores of the particle and reduce the porosity and particle size. In order to maximize porosity one preferably orders the osmotic pressures so that the osmotic pressure of the outer phase is lowest, while the osmotic pressure of the interior water phase is highest. Thus the water will diffuse following the osmotic gradient from the external water phase into the organic binder phase and then into the internal water phase swelling the size of the pores and increasing the porosity and particle size.

If it is desirable to have small pores and maintain the initial small drop size formed in the step one emulsion then the osmotic pressure of both the interior and exterior water phase should be preferably matched, or have a small osmotic pressure gradient. It is also preferable that the osmotic pressure of the exterior and interior water phases be higher than the organic binder phase. When using weakly dissociating hydrocolloids such as CMC, one can change the pH of the exterior water phase using acid or a buffer preferably a pH 4 citrate buffer. The hydrogen and hydroxide ions diffuse rapidly into the interior water phase and equilibrate the pH with the exterior phase. The drop in pH of the interior water phase containing the CMC thus reduces the osmotic pressure of the CMC. By designing the equilibrated pH correctly one can control the hydrocolloid osmotic pressure and thus the final porosity and particle size.

One can also control the surface morphology as to whether there are open pores (surface craters) or closed pores (a surface shell). If the osmotic pressure of the interior water phase is sufficiently low relative to the exterior water phase the pores near the surface will burst to the surface and create an "open pore" surface morphology during drying in the third step of the process.

The third step in the preparation of the porous particles of this invention involves removal of both the solvent that is used to dissolve the binder polymer and most of the first water phase so as to produce a suspension of uniform porous polymer particles in aqueous solution. The rate, temperature and pressure during drying will also impact the final particle size and surface morphology. Clearly the details of the importance of this process depend on the water solubility and boiling point of the organic phase relative to the temperature of drying process. Solvent removal apparatus such as a rotary evaporator or a flash evaporator may be used in the practice of the method of this invention. The polymer particles are isolated followed by drying in an oven at 40° C. that also removes any water remaining in the pores from the first water phase. Optionally, the particles are treated with alkali to remove the silica stabilizer.

Optionally, the third step in the preparation of porous particles described above may be preceded by the addition of additional water prior to removal of the solvent and drying.

The average particle diameter of porous toner obtained by the described process typically may be, for example, 3 to 50 micrometers, preferably 3 to 15 micrometers.

Alternatively, the pore stabilizing hydrocolloid may be emulsified in a mixture of water-immiscible polymerizable monomers, a polymerization initiator and optionally a colorant and a charge control agent to form the first water in oil emulsion. The resulting emulsion may then be dispersed in water containing stabilizer as described in the second step of the process to form a water-in-oil-in-water emulsion preferably through the limited coalescence process. The monomers in the emulsified mixture are polymerized in the third step, preferably through the application of heat or radiation. The resulting suspension polymerized particles may be isolated and dried as described earlier to yield porous particles. In addition the mixture of water-immiscible polymerizable monomers can contain the binder polymers listed previously.

The invention will further be illustrated by the following examples. They are not intended to be exhaustive of all possible variations of the invention.

EXAMPLES

Materials:

The wax used in all the examples was the ester wax WE-3® from NOF Corporation. The Dispersants used in the examples are given in Table 1. D-1 was purchased from Asahi Kasei Chemicals. D-2-D-6 were prepared according to Domski, Gregory J.: Rose, Jeffrey M.; Coates, Geoffrey W.; Bolig, Andrew D.; Brookhart, Maurice; Progress in Polymer Science 32(1), 30-92 (2007) and US 20060089252(A1). Dispersants D2-D6 are described in Table 1, where PE is polyethylene, PEB hydrogenated polyethylene butylenes, PLA, and PCL stand for polylactic acid and polycaprolactone respectively and PPO and PPC stand for polypropylene oxide and polypropylene carbonate respectively. D-7 and D-8 were obtained from Baker Hughes and are alpha olefin maleic anhydride alternating copolymers as described in Table 1. The binder used for making toners containing the wax dispersions of this invention was KaoE, a bisphenol-A based polyester polymer from Kao Corporation. Co-dispersant CD-1 is ethyl cellulose, Mw ~77.5K, 46% ethoxyl content, obtained from Aldrich Corporation. Co-dispersant CD-2 is vinyl acetal polymer KS-10, Mw ~50K, obtained from Sekisui Chemical Co.

TABLE 1

| Dispersant | Description |
|---|---|
| D-1 | Styrene-butadiene copolymer |
| D-2 | PE-b-(PPC-co-PPO) Mn = 935 (PE = 375; PPC-co-PPO = 560)* |
| D-3 | PPC-b-PEB-b-PPC Mn = 8.3K (PEB = 2.5K; PPC = 2.9K ea.) |
| D-4 | PCL-b-PEB-b-PCL Mn = 12K (PEB = 2.5K; PCL = 4.75K ea.) |
| D-5 | PLA-b-PEB-b-PLA Mn = 10K (PEB = 2.5K; PLA = 3.75K ea.) |
| D-6 | PCL-b-PE Mn = 9400 (PE = 550; PCL = 8.85K) |
| D-7 | Ceramer 1608 ® alpha-olefin/maleic anhydride 30+ carbons in alpha-olefin, Mp = 78 C., viscosity = 550 mPa-s @ 149 C., saponification# = 212 |
| D-8 | X-5399 ® alpha-olefin/maleic anhydride (Baker Hughes) 24-26 carbons in alpha-olefin, Mp = 82 C., viscosity = 195 mPa-s @ 149 C., saponification# = 147 |

*PPC-co-PPO segment is not polyester compatible due to presence of PPO

Preparation of Wax Dispersions
Dispersion C-1 (Comparison)

A solid particle dispersion of WE-3® wax was prepared by adding 15 g of WE-3 wax, 3g of Dispersant D-1, 82g of ethyl acetate and 250 mL of 1.8 mm zirconium oxide beads to a 16 oz glass jar. The jar was rolled at a speed of 75 ft/min for 5-7 days. After milling, the dispersion was passed through a fine metal screen to separate the dispersion from the beads. The final dispersion was examined by optical microscopy, particle size obtained by dynamic light scattering using the UPA150® Ultrafine Particle Analyzer by Matec Corp.

Dispersion C-2 (Comparison)

Dispersion C-2 was prepared in the same manner as Dispersion C-1 except dispersant D-2 was used in place of dispersant D-1.

Dispersion I-1 (Invention)

Dispersion I-1 was prepared in the same manner as Dispersion C-1 except dispersant D-3 was used in place of dispersant D-1.

Dispersion I-2 (Invention)

Dispersion I-2 was prepared in the same manner as Dispersion C-1 except 2.25 g dispersant D-3 was used in place of dispersant D-1 and 82.75g ethyl acetate was used.

Dispersion I-3 (Invention)

Dispersion I-3 was prepared in the same manner as Dispersion C-1 except 1.50g dispersant D-3 was used in place of dispersant D-1 and 83.5 g ethyl acetate was used.

Dispersion I-4 (Invention)

Dispersion I-4 was prepared in the same manner as Dispersion C-1 except Dispersant D-4 was used in place of dispersant D-1.

Dispersion I-5 (Invention)

Dispersion I-5 was prepared in the same manner as Dispersion A except Dispersant D-5 was used in place of dispersant D-1.

Dispersion I-6 (Invention)

Dispersion I-6 was prepared in the same manner as Dispersion C-1 except dispersant D-6 was used in place of dispersant D-1.

Dispersion I-7 (Invention)

Dispersion I-7 was prepared in the same manner as Dispersion C-1 except 2.25 g Dispersant D-7 was used in place of dispersant D-1 and 82.75 g ethyl acetate was used.

Dispersion I-8 (Invention)

Dispersion I-8 was prepared in the same manner as Dispersion C-1 except Dispersant D-8 was used in place of dispersant D-1.

Dispersion I-9 (Invention)

Dispersion I-9 was prepared in the same manner as Dispersion C-1 except the total dispersion batch size was 25 g. The dispersion was prepared by adding 2.5 g of WE-3 wax, 0.38 g of Dispersant D-7, 0.38 g of co-dispersant CD-1, 21.75 g of ethyl acetate and 60 mL of 1.8 mm zirconium oxide beads to a 4 oz glass jar.

Dispersion I-10 (Invention)

Dispersion I-10 was prepared in the same manner as Dispersion I-9 except 0.38 g of co-dispersant CD-2 was used in place of codispersant CD-1.

Table 2 shows the optical microscopy and particle sizing results of the dispersions. FIGS. 1-12 show the photomicrographs of the dispersions C-1, C-2, and I-1 to I-10, respectively. All dispersions of the invention had small, well dispersed particles, compared to the comparison dispersions, which had large flocculated particles. Dispersions I-9 and I-10 exhibited particularly desirable small particles size and narrow particle size distributions.

TABLE 2

| Wax Dispersion | Wax Dispersant | Microscopy 1110X magnification | UPA 50 vol % (microns) | UPA 95 vol % (microns) |
|---|---|---|---|---|
| C-1 (Comparison) | D-1 | Flocculated, large particles | 1.1490 | 1.4030 |
| C-2 (Comparison) | D-2 | Flocculated, large particles | Did not meas. | Did not meas. |
| I-1 (Invention) | D-3 (Invention) | Well dispersed, small particles | 0.2950 | 0.8006 |
| I-2 (Invention) | D-3 (Invention) | Well dispersed, small particles | 0.3154 | 0.6853 |
| I-3 (Invention) | D-3 (Invention) | Well dispersed, small particles | 0.5145 | 1.4710 |
| I-4 (Invention) | D-4 (Invention) | Well dispersed, small particles | 0.5456 | 0.9031 |
| I-5 (Invention) | D-5 (Invention) | Well dispersed, small particles | 0.5590 | 2.055 |
| I-6 (Invention) | D-6 (Invention) | Well dispersed, small particles | 0.1827 | 0.5416 |
| I-7 (Invention) | D-7 (Invention) | Well dispersed, small particles | 0.3754 | 0.7410 |
| I-8 (Invention) | D-8 (Invention) | Well dispersed, small particles | 0.3331 | 0.5021 |
| I-9 (Invention) | D-9 (Invention) | Well dispersed, small particles | 0.3001 | 0.5039 |
| I-10 (Invention) | D-10 (Invention) | Well dispersed, small particles | 0.2491 | 0.4785 |

Preparation of Toners from Wax Dispersions

The toners in the following examples contained, by weight, 5.6% PB15:3 cyan pigment, 8% wax, 0.8-1.2% wax dispersant and 85.2-85.6% polyester binder and were made using the Evaporative Limited Coalescence process.

Typical Procedure for Preparing the Toners

A 100 g dispersion of ethyl acetate containing 20% by weight of Kao E polyester toner binder resin along with the colorant and wax dispersion (in the preparation of TC2, no wax dispersion was used ) was added to 150 g of an aqueous phase of a pH 4 phthalate buffer containing 16.3 g of NAL-COAG® 1060. This mixture was then subjected to very high shear using a Silverson Model L4R mixer, followed by a homogenizer by MICROFLUIDIZER® Model 110F homogenizer. After exiting, the oil in water dispersion was diluted 1:1 with water and the ethyl acetate was removed in a rotary evaporator under reduced pressure at 40 C. The silica was removed by raising the pH of the slurry to 12 for 15 minutes. These particles were filtered, washed with water, and dried.

Charge/Mass (Q/m) Measurements of the Toners

Charge per mass was measured off-line by MECCA method, where the test samples that are measured are prepared by exercising the developer with rotating magnets to create a magnetic field that results in the physical mixing of the particles causing the particles to charge for a period of 2 minutes and then 8 additional minutes. The toner Q/m ratio was measured in a MECCA device comprised of two spaced-apart, parallel, electrode plates which applies both an electrical and magnetic field to the developer samples, thereby causing a separation of the two components of the mixture, i.e., carrier and toner particles, under the combined influence of a magnetic and electric field. A 0.100 g sample of a developer mixture is placed on the bottom metal plate. The sample is then subjected for thirty seconds to a 60 Hz magnetic field and potential of 2000 V across the plates, which causes developer agitation. The toner particles are released from the carrier particles under the combined influence of the magnetic and electric fields and are attracted to and thereby deposit on the upper electrode plate, while the magnetic carrier particles are held on the lower plate. An electrometer measures the accumulated charge of the toner on the upper plate. The toner Q/m ratio in terms of microcoulombs per gram (µC/g) is calculated by dividing the accumulated charge by the mass of the deposited toner taken from the upper plate.

Covering Power Measurements

The tinctorial strength of the toners was evaluated as a "covering power" value. A series of patches of varying density of toner was prepared on clear film; the weight of toner in each patch and area of each patch was measured. The patches were then fused in an oven controlled at a temperature hot enough such that a continuous thin film of toner resulted. The transmission densities of the resulting patches were measured with a Status A blue filter on an X-Rite densitometer. A straight line was drawn through the data for each toner, and the weight per unit area of toner was then calculated at a transmission density of 1.0. The reciprocal of this value, in units of square centimeters per gram, is defined as the covering power (the area covered to a transmission density of 1.0 by one gram of toner). As the covering power increases, the "yield" of the toner increases, that is, less mass is needed to create the same amount of density/area coverage in a print.

Table 3 shows results for cyan toners containing the wax dispersions. Toners TI-1 through TI-8 made with dispersions of the invention showed acceptable charging behavior and higher covering power than toner TC-made with the comparison wax dispersion, and equivalent covering power to toner TC-2 prepared without a wax dispersion. This shows that the dispersants of this invention had no adverse effects on the covering power and that the covering power was comparable to the toner without wax. Whereas the covering power of the toner containing the wax dispersion C-1 was lower due to pigment flocculation in the toner binder system.

TABLE 3

| Toner | Wax Dispersion | Covering Power, cm²/g | Q/m, uC/g, 2 min | Q/m, uC/g, 10 min |
|---|---|---|---|---|
| TC-1 (Comparison) | C-1 | 2240 | −30.36 | −134.13 |
| TC-2 (Comparison) | None | 3214 | −15.64 | −94.55 |
| TI-1 (Invention) | I-1 | 3154 | −11.51 | −202.56 |

TABLE 3-continued

| Toner | Wax Dispersion | Covering Power, cm²/g | Q/m, uC/g, 2 min | Q/m, uC/g 10 min |
|---|---|---|---|---|
| TI-2 (Invention) | I-2 | 3463 | −73.75 | −216.90 |
| TI-3 (Invention) | I-3 | 3285 | −141.11 | −209.11 |
| TI-4 (Invention) | I-4 | 3484 | −148.20 | −212.50 |
| TI-5 (Invention) | I-5 | 3397 | −139.62 | −219.29 |
| TI-6 (Invention) | I-6 | 3196 | −66.94 | −155.51 |
| TI-7 (Invention) | I-7 | 3181 | −84.56 | −153.33 |
| TI-8 (Invention) | I-8 | 2830 | −169.77 | −249.74 |

The invention claimed is:

1. A dispersion comprising wax particles dispersed with a polymeric dispersant in a water immiscible solvent, wherein the dispersant comprises a wax-compatible polyolefin segment and a polyester compatible oleophilic polar segment, wherein the wax-compatible segment comprises at least one of polyethylene or polypropylene, or polybutadiene, or poly(ethylene-co-butylene) and the polyester compatible oleophilic polar segment comprises at least one of poly(alkylene carbonate) or poly(alkyl lactones) or poly(lactic acid) or polyalkanoates or maleic anhydride polymer or maleic acid ester polymer.

2. The dispersion of claim 1 wherein the wax is selected from the group consisting of polyolefin waxes, carbonyl group-containing waxes, and fluorinated waxes.

3. The dispersion of claim 1 wherein the wax has a melting point of from 40-160° C., and a melt viscosity of 5-1000 cps at a temperature higher by 20° C. than the melting point thereof.

4. The dispersion of claim 1 wherein the wax has a percent crystallinity of greater than 50 percent.

5. The dispersion of claim 1 wherein the wax comprises an ester wax.

6. The dispersion of claim 1 wherein the polymeric dispersant has a total molar mass between 750 daltons and 10,000 daltons.

7. The dispersion of claim 6 wherein the wax-compatible segment comprises at least one of polyethylene or poly(ethylene-co-butylene) and the polyester compatible oleophilic polar segment comprises at least one of poly(propylene carbonate) or poly(caprolactone) or poly(lactic acid) or maleic anhydride polymer or maleic acid ester polymer.

8. The dispersion of claim 1 wherein the wax particles have a median particle size of less than 1 micron.

9. The dispersion of claim 1 wherein the wax particles have a median particle size of from 0.2 to 0.7 micron.

10. The dispersion of claim 1 wherein the solvent comprises ethyl acetate, propyl acetate, chloromethane, dichloromethane, 2-butanone, trichloromethane, carbon tetrachloride, 1,2-dichloroethane, 1,1,1-trichloroethane, toluene, xylene, or cyclohexanone.

11. The dispersion of claim 1 wherein the solvent comprises an ester solvent.

12. The dispersion of claim 1 wherein the wax particles comprise from 0.1 to 50 weight percent of the dispersion.

13. The dispersion of claim 1, further comprising a polyester polymer binder dissolved in the solvent.

14. The dispersion of claim 1, further comprising a co-dispersant selected from the group consisting of cellulose derivatives and vinyl acetal polymers and copolymers.

15. A method of manufacturing a dispersion of claim 1, comprising:
   forming a solution of a water immiscible ester solvent and a polymeric dispersant comprising the wax-compatible polyolefin segment and the polyester compatible oleophilic polar segment;
   adding wax to the solution to form a slurry; and
   reducing the particle size of the wax through comminution of the slurry.

16. The method of claim 15, wherein the solution further comprises a polyester polymer binder dissolved in the solvent.

17. The method of claim 15, wherein the solutions further comprises a co-dispersant selected from the group consisting of cellulose derivatives and vinyl acetal polymers and copolymers.

18. A method of manufacturing wax-containing polymer particles by limited coalescence comprising:
   dissolving a polyester polymer binder in a solvent to form a first solution;
   adding a wax dispersion according to claim 1 to said first solution;
   emulsifying the resulting first solution with added wax dispersion together with an aqueous solution containing a particulate stabilizer to form an emulsion; and
   removing the solvent from the emulsion to form polymer particles with incorporated wax particles.

19. The method of claim 18 wherein the emulsion further comprises charge control agents and colorants.

20. A method of manufacturing wax-containing porous polymer particles by limited coalescence comprising:
   providing a first emulsion of a first aqueous phase comprising a pore stabilizing hydrocolloid dispersed in an organic solution containing a polyester polymer binder and a wax dispersion according to claim 1;
   dispersing the first emulsion in a second aqueous phase to form a second emulsion;
   shearing the second emulsion in the presence of a particulate stabilizing agent to form droplets of the first emulsion in the second aqueous phase; and
   evaporating the organic solution from the droplets to form porous polymer particles with incorporated wax particles.

* * * * *